United States Patent [19]

Yonemitsu et al.

[11] 3,962,180

[45] June 8, 1976

[54] PROCESS FOR POLYMERIZING PHENOLS TO PRODUCE POLYPHENYLENE OXIDES OF LOW MOLECULAR WEIGHT

[75] Inventors: Eiichi Yonemitsu, Kashiwa; Akitoshi Sugio, Omiya; Akihiko Konishi, Kashiwa, all of Japan

[73] Assignee: Mitsubishi Gas Chemical Company, Inc., Tokyo, Japan

[22] Filed: Oct. 30, 1974

[21] Appl. No.: 519,196

[30] Foreign Application Priority Data

Nov. 2, 1973  Japan.............................. 48-123731

[52] U.S. Cl. ......................... 260/47 ET; 260/613 R
[51] Int. Cl.² .......................................... C08G 61/10
[58] Field of Search ..................... 260/47 ET, 613 R

[56] References Cited

UNITED STATES PATENTS

| | | | |
|---|---|---|---|
| 3,306,874 | 2/1967 | Hay | 260/47 ET |
| 3,306,875 | 2/1967 | Hay | 260/47 ET |
| 3,337,499 | 8/1967 | Bussink et al. | 260/47 ET |
| 3,573,257 | 3/1971 | Nakashio et al. | 260/47 ET |
| 3,733,299 | 5/1973 | Cooper et al. | 260/47 ET |

*Primary Examiner*—Lucille M. Phynes
*Attorney, Agent, or Firm*—Brooks Haidt Haffner & Delahunty

[57] ABSTRACT

Polyphenylene oxides of low molecular weight are produced by oxidative polymerization of phenols in the presence of a catalyst and the amount of solvent is limited and the phenols are not added to the reaction medium at one time, but continuously over a certain period of time.

9 Claims, No Drawings

PROCESS FOR POLYMERIZING PHENOLS TO PRODUCE POLYPHENYLENE OXIDES OF LOW MOLECULAR WEIGHT

BACKGROUND OF THE INVENTION

1. Field of the Invention

This invention relates to a process for producing polyphenylene oxides of low molecular weight. 2. Description of the Prior Art Processes for producing polyphenylene oxide by oxidative polymerization of phenols are known. For example, the processes employing copper compounds as catalyst are described in U.S. Pat. Nos. 3,306,874; 3,306,875; and 3,337,499, the processes employing manganese compounds as catalyst in Japanese Pat. Publication Nos. 3195/1967, 30354/1970 and 30355/1970, and British Pat. Nos. 1189405 and 1330326, and the processes employing cobalt compounds as catalyst in Japanese Pat. Publication No. 23555/1970 and German Pat. No. 1720240. These processes are contemplated to produce polyphenylene oxides of high molecular weight having a degree of polymerization of higher than 100, which have been used for various purposes such as molded material utilizing the excellent thermal properties, mechanical property and electrical properties.

Polyphenylene oxides of low molecular weight also have excellent thermal, mechanical and electrical properties, good solubility, film shapeability and adhesivity so that they are expected to be used for various applications such as films, tape, binder, adhesive and plasticizer.

According to the aforementioned prior art processes for producing polyphenylene oxides, polypheylene oxide of high molecular weight is hardly soluble in the reaction medium so that a large amount of a solvent is used in the reaction system to avoid that the resulting polymer becomes insoluble and the propagation of polymerization is inhibited. Usually, there is used a solvent of more than 10 times (by weight) the amount of monomeric phenols and the polymerization reaction is carried out at such low concentration of monomers. In these processes it is also possible to produce polyphenylene oxides of low molecular weight by stopping the reaction of growing the polymers, but the product is so highly soluble in the reaction medium that the yield of polymer is very low and therefore, these are not economically efficient processes for producing polyphenylene oxides of low molecular weight. On the contrary, when the amount of the solvent is decreased and the polymerization reaction is effected at a high concentration of monomeric phenols for the purpose of enhancing the yield of the polymers, such various phenomena are brought about that the period of polymerization is disadvantageously lengthened owing to the lowered polymerization rate, there are produced polymers having branched chain structures due to the presence of monomeric phenols in high concentration in the reaction medium, caused oxidation of side chains of the monomer and polymer and the formation of by-products of diphenoquinone type is inevitable. Thus, the yield is not increased and the resuslting polymer products are remarkably colored and in addition, the distribution of molecular weight in the polymer is very broad. In summary, it is not practically possible to produce preferably polyphenylene oxides of low molecular weight by the aforementioned prior art processes.

SUMMARY OF THE INVENTION

According to the present invention, there is provided a process for polymerizing phenols to produce polyphenylene oxides of low molecular weight comprising oxidatively polymerizing phenols with oxygen or a gas containing oxygen in the presence of at least one catalyst selected from the group consisting of a combination of a copper compound and amines, a combination of a manganese compound and amines or other basic compounds, and a combination of a cobalt compound and amines in a solvent of an amount of 1 – 6 times the amount of the phenols and the phenols being continuously added to the reaction medium containing the catalyst.

An object of this invention is to provide a process for polymerizing phenols in the presence of oxygen to produce polyphenylene oxides of low molecular weight wherein the solvent amount is limited and the starting phenols are not added to the reaction medum containing a catayst at one time, but continuously over a certain period of time.

Another object of this invention is to provide substantially colorless polyphenylene oxides of straight chain type having low molecular weight.

A further object of this invention is to provide polyphenylene oxides of low molecular weight in good yield.

Still another object of this invention is to provide polyphenylene oxides of low molecular weight having a narrow distribution of molecular weight.

A still further object of this invention is to provide an economical process for producing polyphenylene oxides of low molecular weight wherein phenols of low purity without highly purifying may be used as starting material.

DESCRIPTION OF THE PREFERRED EMBODIMENT

Representative phenols suitable for the present invention are monohydric monocyclic phenols having the general formula:

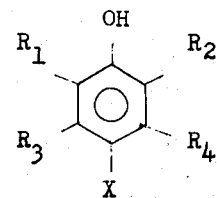

wherein X is a substituent selected from the group consisting of hydrogen, chloro, bromo and iodo, $R_1$ is selected from the group consisting of hydrogen, hydrocarbon radicals, alkoxy, halohydrocarbon radicals and haloalkoxy, and $R_2$, $R_3$ and $R_4$ are the same as $R_1$ and, in addition, halogen.

Typical examples of the phenols are phenol, cresol, 2-ethylphenol, 2-chlorophenol, 2-benzylphenol, 3-phenylphenol, 3-butylphenol, 4-bromophenol, 2,6-dimethylphenol, 2,6-diethylphenol, 2,6-dipropylphenol, 2,6-dibutylphenol, 2,6-dibenzylphenol, 2,6-dilaurylphenol, 2,6-dimethoxyphenol, 2,6-diethoxyphenol, 2,6-ditolylphenol, 2,6-bis(chloroethyl)phenol, 2,6-bis(chlorophenoxy)phenol, 2,6-bis(phenylethyl)-phenol, 3,5-dimethylphenol, 3,5-diethylphenol, 3,5-dimethoxyphenol, 2,5-dimethylphenol, 2,3,6-trimethylphenol, 2,3,5,6-tetramethylphenol, 2-chloro-6-methylphenol, 2-allyl-6-phenylphenol, 2-methyl-6-butylphenol, 2-methyl-6-benzylphenol, 2-methyl-6-chloroethylphenol, 2,6-dimethyl-4-chlorophenol, 2,6-dimethyl-4-bromophenol, and 2,4-dichloro-6-methylphenol, etc. These phenols may be used alone or in combination. Furthermore, the phenols containing polysubstituted aromatic hydrocarbons as an impurity, for example, 2,3,6-trialkylphenol, also may be used as mentioned above. Preferably phenols are 2,6-dialkyl or diaryl phenols.

According to the present invention, the phenols are continuously added to the reaction medium containing the catalyst. This "continuous addition" may be effected by adding continuously without break or adding intermittently during a certain period of time. The phenols may be added in any form of solid, melt or solution. The period of time for adding of monomeric phenol is not critical unless the addition is effected at one time and may be determined upon activation state of the catalyst. It preferably ranges from 5 minutes to a time perod up to a time at which the speed of addition of the phenol becomes a rate-controlling factor to polymerization. It is usually less than 200 min.

It is employed in prior art of producing polyphenylene oxides of high molecular weight that starting phenols are gradually added to a reaction medium containing a catalyst upon oxidative polymerization of phenols. For example, U.S. Pat. No. 3,306,874 discloses such procedure, but the procedure is only one embodiment of producing polyphenylene oxides of high molecular weight and contemplates to shorten the reaction time by increasing the ratio of the catalyst to the starting phenols. The purpose of this procedure is to produce essentially polyphenylene oxides of high molecular weight so that a large amount of solvent should be employed in view of solublity of the end product. On the contrary, according to the present invention, only a limted amount of solvent is used and such condition can not produce polyphenylene oxides of high molecular weight.

The amount of a solvent is limited in the present invention. At least it is necessary that the amount is less than that of solvent used for the preparation of conventional polyphenylene oxides of high molecular weight. Further, taking into consideration the effect of rendering the molecular weight distribution of the desired polymer small, it is necessary to select an amount of not more than 6 times the amount of the starting phenols. For the purpose of selecting an economical addition time of phenols, the amount of solvent should be at least the same amount as that of the starting phenols.

As far as processes for preparing polyphenylene oxides are concerned, the procedure of limiting the solvent to a small amount according to the present invention is not preferred because it results in an undesirable reaction medium of high monomer concentration which causes various disadvantages as mentioned previously. However, such disadvantages can be overcome by adding the starting phenols continuously to the reaction medium according to the present invention and substantially colorless products can be obtained in a short time. In addition, the limited amount of solvent favors to obtain the desired product at high concentration and recover the product in high yield by, for example, precipitation with a nonsolvent for the product.

The solvent may be any one capable of dissolving the resulting polyphenylene oxide of low molecular weight. Typical examples of preferred solvents are aromatic hydrocarbons such as benzene, toluene, xylene and the like and halogenated hydrocarbons such as chloroform, carbon tetrachloride, chlorobenzene and the like.

Typical examples of catalysts which may be used in the present invention are a combination of a copper compound and amines, such as the amines-basic cupric salt complex disclosed in U.S. Pat. No. 3,306,374 and 3,306,375 or organo copper compound and amines disclosed in U.S. Pat. No. 3,337,499; a combination of a manganese compound and amines and or other basic compounds, which are tertiary amines in Japanese Pat. Publication No. 3195/1967 and British Pat. No. 1189405, the other basic compounds, for example metal hydroxides, in Japanese Publication Pat. No. 30354/1970, and primary amines in British Pat. No. 1,330,326; and a combination of a cobalt compound and amines, such as an organic or inorganic cobalt compound and secondary or tertiary amines disclosed in Japanese Pat. Publication No. 23555/1970 and cobalt-containing chelate compound included amines as ligand disclosed in German Pat. No. 1720240.

In addition, when the combined catalyst has only a low catalytic activity, for example, a combination of amines with cupric carbonate, cupric oxide, cupric hydroxide or cuprous compound, there may be added, as the third component, iodine or iodide compound, such as hydrogen iodide, potassium iodide, sodium iodide, ethyl iodide or other iodide so as to act as a cocatalyst.

The above mentioned three types of combination catalysts may be used alone or in combination.

The ratio of the amount of the catalyst to the amount of the starting phenols, and the ratio of the metal to the amines or the other basic compounds in the catalyst are not limited in the present invention, and the ratios used in the prior art may be employed. The amount of the solvent and/or activity of the catalyst is taken into consideration upon selecting type and amount of the catalyst to obtain a desired polyphenylene oxide of low molecular weight, but they are a matter of choice.

The polymerization reaction temperature is not critical as long as the temperature is below boiling point of the solvent, and the reaction temperature usually ranges from 10°C to 80°C.

The oxidizing agent used in the oxidative polymerization in the present invention is oxygen or a gas contaning oxygen such as air, a mixture of oxygen and an inert gas, and the like.

The following examples are given for the purpose of illustration and not by way of limitation.

EXAMPLE 1

To a reaction vessel equipped with a gas inlet tube, a reflux condenser, a dropping funnel, a thermometer and a stirrer were added 0.1 g. of cuprous iodide, 5 g. of n-butylamine and 35 g. of toluene and air was blown into the mixture with vigorous stirring at 50°C at a flow rate of 1.5 l./min. A solution of 15 g. of 2,6-dimethylphenol in 15 g. of toulene was dropwise added from the dropping funnel over 70 minutes. After completion of the adding, the stirring and air-blowing were continued for 10 min. and the reaction procedure was finished in total in 80 min. The amount of oxygen absorbed was 1.55 l. To the resulting reaction mixture was added an excess amount of methanol containing hydrochloric acid with stirring and the separated polymer was recovered by filtration, washed sufficiently, and dried at 80°C to a constant amount to give 13.94 g. of almost colorless poly-(2,6-dimethyl-1,4-phenylene)oxide. Intrinsic viscosity of the polymer was 0.24 dl./g. (measured at 25°C. in chloroform) and number average molecular weight and weight average molecular weight of the polymer were 6,900 and 13,200, respectively (measured by Gel Permeation Chromatograph GPC-1A Type manufactured by Shimazu Seisakusho). Hunter's whiteness of the polymer was 80.0 (measured by Color Studio CS-K5 Type. manufactured by Nihon Denshoku Kogyo, using a solution of polymer 1 g./chloroform 20 ml.).

EXAMPLES 2–4

Following the procedure of Example 1 'except that a mixture of 14.5 g. of 2,6-dimethylphenol and 0.5 g. of another phenol shown in Table 1 below was used instead of 15 g. of the 2,6-dimethylphenol, the result is shown in Table 1 below.

TABLE 1.

| Example | 2 | 3 | 4 |
| --- | --- | --- | --- |
| Phenols | Phenol | O-Cresol | Anisol |
| Reaction time (min.) | 125 | 120 | 100 |
| Amount of oxygen absorbed(l.) | 1.52 | 1.52 | 1.51 |
| Yield of polymer (g.) | 13.17 | 13.65 | 14.01 |
| Intrinsic viscosity (dl./g.) | 0.19 | 0.23 | 0.28 |
| Number average molecular weight | 5,400 | 6,400 | 7,800 |
| Weight average molecular weight | 10,700 | 12,400 | 15,400 |

EXAMPLE 5

To a reaction similar to that in Example 1 were added 0.5 g. of manganous chloride and 15 ml. of methanol, and the reaction vessel is flushed with oxygen, and then the reaction mixture was stirred at 50°C to form a methanol solution of manganese chloride. To the resulting solution was added a mixture of n-butylamine 9 g. and toluene 75 g. from a dropping funnel over 10 min. and stirred for further 10 min. to prepare a catalyst solution. Into the catalyst solution was blown oxygen at a flow rate of 15l./min. and a mixture of 2,6-dimethylphenol 15 g. and toluene 15 g. was added thereto from a dropping funnel over 90 min. with stirring. Stirring and oxygen blowing were continued for further 20 min. and the reaction was finished in 110 min. in total. The amount of oxygen absorbed was 1.53 l. The reaction product was then treated in a way similar to Example 1 to give polyphenylene oxide in yield of 13.5 g. Intrinsic viscosity, number average molecular weight, weight averave molecular weight, and Hunter's whiteness of the polyphenylene oxide were 0.22; 6,000; 12,000; and 84.0.

REFERENCE EXAMPLE 1

Example 1 was repeated except that a mixture of 15 g. of 2,6-dimethylphenol and 15 g. of toluene was added to the catalyst solution at one time. Absorption of air finished in 220 min. and the amount of oxygen absorbed was 1.59l. The reaction product was treated in a way similar to Example 1 to obtain 13.40 g. of polyphenylene oxide. Intrinsic viscosity of the polyphenylene oxide was 0.24 dl./g and its Hunter's whiteness was 59.2, which means the polymer is colored.

REFERENCE EXAMPLE 2

Example 2 was repeated except that the starting material, phenol mixture, was added to the catalyst solution at one time. Air blowing was continued for 300 min. and the amount of oxygen absorbed was 0.61 l., but no polyphenylene oxide was obtained.

We claim:

1. A process for polymerizing phenols to produce polyphenylene oxides of low molecular weight which comprises oxidative polymerization of phenols with oxygen or a gas containing oxygen in the presence of a catalyst selected from the group consisting of a combination of a copper compound and an amine, a combination of a manganese compound and amines or other basic compounds and a combination of a cobalt compound and an amine, in a solvent of an amount of 1 – 6 times the amount of the phenols and the phenols being added continuously to the reaction medium containing the catalyst.

2. A process according to claim 1 in which the phenol has the formula:

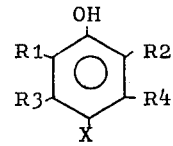

wherein X is a substituent selected from the group consisting of hydrogen, chloro, bromo and iodo, R1 is selected from the group consisting of hydrogen, hydrocarbon radicals, alkoxy, halohydrocarbon radicals and haloalkoxy, and R2, R3 and R4 are the same as R1 and, in addition, halogen.

3. A process according to claim 1 in which the phenol is a member selected from the group consisting of alkyl phenols and aryl phenols.

4. A process according to claim 3 in which the alkyl phenols are dialkyl phenols and the aryl phenols are diaryl phenols.

5. A process according to claim 1 in which the catalyst is a primary, secondary or tetriary amine-basic cupric salt complex.

6. A process according to claim 1 in which the catalyst is a combination of a cuprous compound, an amine and iodine or iodo compound.

7. A process accordng to claim 6 in which the cuprous compound is cuprous iodide.

8. A process according to claim 6 in which the phenol is selected from the group consisting of alkyl phenols and aryl phenols.

9. A process for polymerizing phenols to produce polyphenylene oxides of low molecular weight which comprises oxidative polymerization of 2,6-dialkyl phenols or 2,6-phenyl or substituted phenyl phenols with oxygen or a gas containing oxygen in the presence of a catalyst composed of cuprous iodide and a primary or secondary amine in a solvent of an amount of 1 – 6 times the amount of the phenols and the phenols being added continuously to the reaction medium containing the catalyst.

* * * * *

UNITED STATES PATENT OFFICE
CERTIFICATE OF CORRECTION

PATENT NO. : 3,962,180
DATED : June 8, 1976
INVENTOR(S) : EIICHI YONEMITSU ET AL It is certified that error appears in the above-identified patent and that said Letters Patent are hereby corrected as shown below:

Column 1, line 33, "films" should read --film--.

Column 2, line 22, correct the spelling of "medium".

Column 3, line 25, correct the spelling of "period".

Column 4, line 51, correct the spelling of "containing".

Column 5, line 40, after "reaction" insert the word --vessel--.

Column 5, line 49, "15l./min." should read --15 l./min.--.

Column 5, line 67, "15l./min." should read --15 l./min.--.

Column 6, line 48, correct the spelling of "tertiary".

Column 6, line 53, correct the spelling of "according".

Signed and Sealed this

Seventh Day of September 1976

[SEAL]

Attest:

RUTH C. MASON
*Attesting Officer*

C. MARSHALL DANN
*Commissioner of Patents and Trademarks*